US008400009B2

United States Patent
Hong et al.

(10) Patent No.: US 8,400,009 B2
(45) Date of Patent: Mar. 19, 2013

(54) INTERFACE FOR BULKHEAD MONITOR AND METHOD FOR USING THE SAME

(75) Inventors: Lili Hong, Diamond Bar, CA (US); Ton Do, Corona, CA (US); Brian Humphrey, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 881 days.

(21) Appl. No.: 11/977,961

(22) Filed: Oct. 26, 2007

(65) Prior Publication Data

US 2008/0244664 A1    Oct. 2, 2008

Related U.S. Application Data

(60) Provisional application No. 60/855,323, filed on Oct. 30, 2006.

(51) Int. Cl.
  *B60L 1/00* (2006.01)
  *B60L 3/00* (2006.01)
  *H02G 3/00* (2006.01)
(52) U.S. Cl. ......................................................... 307/9.1
(58) Field of Classification Search .................. 307/9.1; 725/76; 345/4, 204
  See application file for complete search history.

(56) References Cited

U.S. PATENT DOCUMENTS

| | | | |
|---|---|---|---|
| 4,316,174 A | 2/1982 | Sutton et al. | |
| 4,504,702 A | 3/1985 | Meunter et al. | |
| 5,587,824 A * | 12/1996 | Asprey | 250/226 |
| 5,617,331 A | 4/1997 | Wakai et al. | |
| 7,009,601 B1 | 3/2006 | Sherlock et al. | |
| 7,016,266 B2 * | 3/2006 | Wang | 369/2 |
| 2006/0234700 A1 * | 10/2006 | Funderburk et al. | 455/431 |

* cited by examiner

*Primary Examiner* — Carlos Amaya
(74) *Attorney, Agent, or Firm* — Myers Bigel Sibley & Sajovec

(57) ABSTRACT

An interface for a bulkhead monitor in an in-flight entertainment system, and a method for using the same. More specifically, a one-wire interface use to electrically couple a tapping unit and its associated monitor in an in-flight entertainment system. The wire has a first end for coupling to an input of a comparator in the tapping unit, and a second end for coupling to an input of a comparator in the monitor, to couple the tapping unit to the monitor. The interface further includes a second wire for coupling the wire to a load, such as an indicator which indicates an on or off condition of at least the video monitor. The wire of the interface can also carry a signal indicating a indicating at least one of transmitting state and a receiving state of a microcontroller of the monitor.

14 Claims, 1 Drawing Sheet

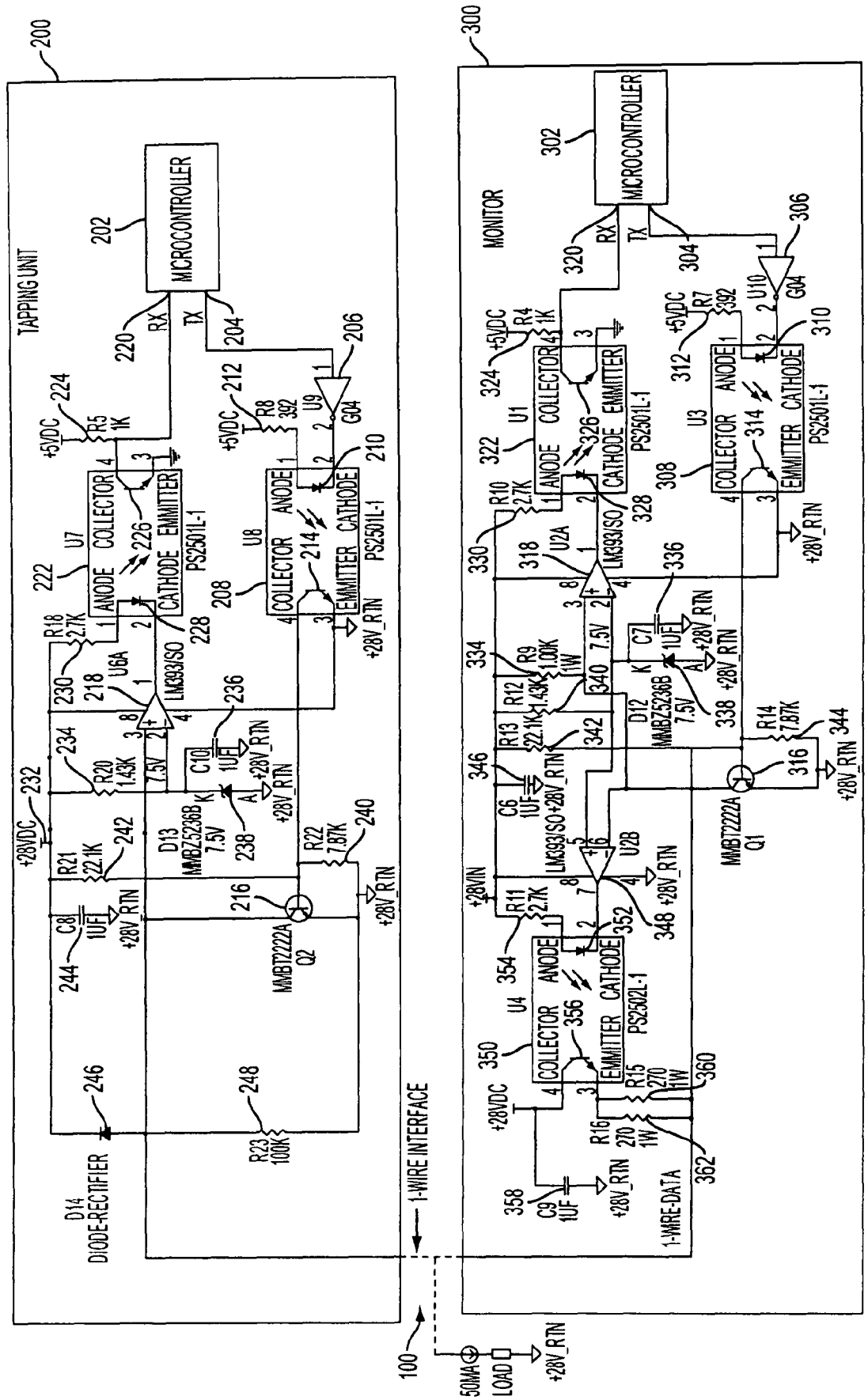

INTERFACE FOR BULKHEAD MONITOR AND METHOD FOR USING THE SAME

CROSS-REFERENCE TO RELATED PATENT APPLICATION

This application claims benefit from U.S. Provisional Patent Application No. 60/855,323, filed on Oct. 30, 2006, the entire content of which being incorporated herein by reference.

BACKGROUND OF THE INVENTION

1. Field of the Invention

The present invention relates to an interface for a bulkhead monitor. More specifically, the present invention relates to a one-wire interface for communicating between a tapping unit and its associated monitor in an in-flight entertainment system.

2. Description of the Related Art

An in-flight entertainment system, such as those deployed on an aircraft, can comprise a video monitor and a tapping unit. As can be appreciated by one skilled in the art, a tapping unit receives signals, for example, from a communication unit, such as a management terminal, and provides those signals to the video monitor. It is desirable to couple the tapping unit to the video monitor in an efficient manner to avoid special wiring in the in-flight entertainment system.

BRIEF DESCRIPTION OF THE DRAWINGS

Certain objects and advantages of the present invention will become more apparent by describing in detail a preferred embodiment thereof with reference to the attached drawings in which:

FIG. 1 is a schematic illustrating an example of an interface between a tapping unit and a video monitor of an in-flight entertainment system according to an embodiment of the present invention.

DETAILED DESCRIPTION OF THE PREFERRED EMBODIMENT

FIG. 1 illustrates an example of an interface 100 between a tapping unit 200 and video monitor 300 in an in-flight entertainment system according to an embodiment of the present invention. As illustrated, and as can be appreciated by one skilled in the art, a tapping unit 200 in this example includes a microcontroller 202 that transmits and receives signals to and from the circuitry in the tapping unit 200. For example, the transmission port 204 of the microcontroller is coupled to the input of an inverter 206 whose output is coupled to an optocoupler 208. In this example, the output of inverter 206 is coupled to the cathode of a light emitting diode 210 in optocoupler 208. The anode of the light emitting diode 210 is coupled to a resistor 212 which is further coupled to a DC voltage power supply, such as a +5 volt DC power supply. The optocoupler 208 further includes a transistor 214 as indicated. The collector of the transistor 214 is coupled to the base of a transistor 216, while the emitter of the transistor 214 is coupled to the negative terminal of power supply 232 (discussed below), which is also coupled to a comparator 218.

The receiving terminal 220 of microcontroller 202 is coupled to an optocoupler 222, as well as resister 224. Resister 224 is further coupled to a power supply, for example, a +5 volt DC power supply. As indicated, the collector of transistor 226 of the optocoupler 222 is coupled to the receiving terminal 220 of microcontroller 202, and the emitter of transistor 226 is coupled to ground. The anode of light emitting diode 228 of optocoupler 222 is coupled to a resistor 230, while the cathode is coupled to the output of comparator 218. The resistor 230 is further coupled to a power supply 232 which, in this example, is a +28 volt DC power supply.

A resistor 234 is coupled between power supply 232 and a capacitor 236, which is further coupled to the negative terminal of the DC power supply 232 (identified as the return +28 V_RTN for the +28V power supply). Resistor 234 is also coupled to the cathode of a zener diode 238, whose anode is coupled to the negative terminal of the DC power supply 232. As further illustrated, power supply 232 is coupled to power comparator 218, and the capacitor 236 and cathode of zener diode 238 are coupled to an input of the comparator 218.

As further illustrated, a resistor 240 is coupled between the negative terminal of power supply 232 and the base of transistor 216, which is further coupled to a resistor 242. Resistor 242 is therefore coupled between the base of transistor 216 and the positive terminal of power supply 232. The collector of transistor 216 is coupled to an input of comparator 218, while the emitter of transistor 216 is coupled to the negative terminal of power supply 232.

In addition, a capacitor 244 is coupled between the positive and negative terminals of power supply 232. The cathode of diode 246 is coupled to the positive terminal of power supply 232, while the anode of diode 244 is coupled to a resistor 248. The other end of resistor 248 is coupled to the negative terminal of power supply 232.

As further illustrated, and as described in more detail below, a wire of interface 100 is coupled to an input terminal of comparator 218 and the collector of transistor 216.

Turning now to the details of the video monitor 300, video monitor 300 includes a microcontroller 302. The transmission terminal 304 of microcontroller 302 is coupled to the input of an inverter 306. The output of inverter 306 is coupled to an optocoupler 308. In particular, the output of inverter 306 is coupled to the cathode of light emitting diode 310 of optocoupler 308, while the anode of light emitting diode 310 is coupled to a resistor 312. The resistor 312 is further coupled to a power supply which, in this example, is a +5 volt DC power supply. The optocoupler 308 further includes a transistor 314, whose collector is coupled to the base of transistor 316, while the emitter of transistor 314 is coupled to a comparator 318 and to a negative terminal of power supply 332 (discussed below).

As further illustrated, the receiving terminal 320 of microcontroller 302 is coupled to an optocoupler 322. In particular, the receiving terminal 320 is coupled to a resistor 324, that is further coupled to a power supply which, in this example, is a +5 volt DC power supply. The receiving terminal 320 is also coupled to a collector of transistor 326 of the optocoupler 322, and the emitter of transistor 326 is coupled to ground. A cathode of light emitting diode 328 of optocoupler 322 is coupled to an output of comparator 318, while the anode of light emitting 328 is coupled to a resistor 330. The resistor 330 is further coupled to a power supply 332 which, in this example, is a +28 volt DC power supply and can be the same power supply as power supply 232 discussed above. However, for purposes of this discussion, the power supply relating to the video monitor 300 will be referred to as power supply 332.

A resistor 334 is coupled between an input terminal of comparator 318 and the power supply 332. A capacitor 336 is coupled between another input terminal of comparator 318 and a negative terminal of power supply 332. Furthermore, the cathode of zener diode 338 is coupled to that input terminal of comparator 318, while the cathode of zener diode 338 is coupled to the negative terminal of power supply 332. A resistor 340 is coupled between the positive terminal of power supply 332 and the cathode of zener diode 338. In addition, a resistor 342 is coupled between the positive terminal of power supply 332 and the base of transistor 316. A resistor 344 is coupled between the base of transistor 316 and the negative terminal of power supply 332. The emitter of transistor 316 is also coupled to the negative terminal of power supply 332. Furthermore, a capacitor 346 is coupled between the positive and negative terminals of power supply 332.

In addition, the collector of transistor 316 is coupled to an input of comparator 348. Comparator 348 is further coupled between a positive and negative terminals of power supply 332, and an input of comparator 348 is coupled to an input of comparator 318 as indicated. The output of comparator 348 is coupled to an optocoupler 350. In particular, the output of comparator 348 is coupled to the cathode of a light emitting diode 352 of optocoupler 350, while the anode of light emitting diode 352 is coupled to a resistor 354, which is further coupled to the positive terminal of power supply 332. The collector of transistor 356 of optocoupler 350 is coupled to the positive terminal of power supply 332, while the emitter is coupled to resistors 360 and 362 that are coupled in parallel to the collector of transistor 316. A capacitor 358 is also coupled between the positive and negative terminals of power supply 332.

In addition, the wire of interface 100 is coupled to the collector of transistor 316, and thus also coupled to an input of comparator 348.

It is noted that the interface 100 is further coupled to a load, such as an indicator lamp, which is coupled to the negative terminal of power supply 232 or 332. The interface 100 in this embodiment uses the wiring of the in-flight entertainment system of the aircraft in which the tapping unit 200 and video monitor 300 are deployed. It is noted that the interface 100 in this example is an RS-232 interface that conforms to a master-slave protocol. That is, the video monitor 300 is the slave device and does not initiate a communication. Rather, the video monitor 300 transmits in response to a message from the tapping unit 200, which acts as the master device. The "ON" indicators of the video monitor 300 function when the video monitor 300 interfaces with the tapping unit 200 or another external device, such as a lamp or relay.

The interface 100 converts the existing discrete line to half duplex RS232 signals for communicating between tapping unit 200 and its associated video monitor 300 in the in-flight entertainment system. In one embodiment, the discrete line used in the interface 100 is the legacy ON INDICATOR wire in the standard cable between the tapping unit 200 and the video monitor 300.

During an initial state, the logic of the 1-wire signal on the interface 100 is logic "low" (i.e., zero voltage). After initialized, the microcontrollers 202 and 302 turn optocouplers 208 and 308, respectively, to an ON state, such that the voltages at the collectors of transistors 226 and 314 are low and the voltages at the cathodes of light emitting diodes 222 and 310 are low, such that transistors 216 and 316 are turned off. The comparator 348 output thus goes low to turn optocoupler 350 ON. The 1-wire signal on interface 100 thus goes to high with +28 VDC. Then, microcontroller 302 in the video monitor 300 is in a receiving mode.

During a transmitting condition, the microcontroller 300 transmits the RS232 signals to other line replaceable units (LRUs) in the in-flight entertainment system. Table 1 below indicates low and high conditions for various points circuitry of the tapping unit 200, the video monitor 300 and the interface 100 and thus, the high and low (on and off) conditions for the transmission mode of the microcontroller 302.

TABLE 1

| TX (+5 V) | U3-2, U8-2 | U3-4, U8-4 | Q1, Q2 | U2-7 | U4 | 1-wire signal (+28 V) |
|---|---|---|---|---|---|---|
| LOW | HI | HI | ON | HI (U2-6 <7.5 V) | OFF | LOW |
| HI | LOW | LOW | OFF | LOW (U2-6 >7.5 V) | ON | HI |

During a receiving condition, the microcontroller 300 receives the RS232 signals from other LRUs. Table 2 below indicates low and high conditions for various points circuitry of the tapping unit 200, the video monitor 300 and the interface 100 and thus, the high and low (on and off) conditions for the receiving mode of the microcontroller 302.

TABLE 2

| 1-wire signal (+28 V) | U2-1, U6-1 | U1-4, U7-4 | RX (+5 V) |
|---|---|---|---|
| HI | HI (U2-3 >7.5 V) | OFF | HI |
| LOW | LOW (U2-3 <7.5 V) | ON | LOW |

The 1-wire signal also serves as the legacy ON INDICATOR function in in-flight entertainment system, and is capable to source up to 50 mA current at logic high level (>18V) to drive an external device such as a relay or a lamp.

Although only a few exemplary embodiments of the present invention have been described in detail above, those skilled in the art will readily appreciate that many modifications are possible in the exemplary embodiments without materially departing from the novel teachings and advantages of this invention. For example, the order and functionality of the steps shown in the processes may be modified in some respects without departing from the spirit of the present invention. Accordingly, all such modifications are intended to be included within the scope of this invention.

What is claimed is:

1. A display system, comprising:
a tapping unit, comprising:
an input that receives control signals from a communication unit of an in-flight entertainment system; and
an output that outputs the received control signals;
a video monitor that displays information related to the control signals from the in-flight entertainment system, the video monitor comprising an input for receiving the control signals; and
an interface between the tapping unit and the video monitor, the interface having a first end connected to an input terminal of a comparator and a collector of a transistor of the tapping unit, and a second end connected to an input terminal of a comparator and a collector of a transistor of the video monitor and being configured to serially transmit signals between the tapping unit and the video monitor.

2. An interface as claimed in claim 1, further comprising:
a second wire connected in a "T" configuration to the wire for coupling the wire to a load that is external of the tapping unit and the monitor.

3. An interface as claimed in claim 2, wherein:
the second wire further couples the wire to a voltage supply via the load.

4. An interface as claimed in claim 2, wherein:
the load includes an indicator; and
the wire passes a signal to control the indicator to indicate an on or off condition of at least the video monitor.

5. An interface as claimed in claim 4, wherein:
the indicator includes a lamp.

6. An interface as claimed in claim 1, wherein:
the wire passes a signal indicating at least one of transmitting state and a receiving state of a microcontroller of the monitor.

7. The display system as claimed in claim 1, wherein the serially transmitted data is communicated using an RS-232 protocol.

8. The display system as claimed in claim 1, wherein the serially transmitted data is transmitted in half-duplex.

9. A method for passing control signals from a communication unit of an in-flight entertainment system to a video monitor in an in-flight entertainment system via a tapping unit, the method comprising:
providing an interface between the tapping unit and the video monitor and having a first end and a second end;
coupling the first end to an input terminal of a comparator and a collector of a transistor of the tapping unit;
coupling the second end to an input terminal of a comparator and a collector of a transistor of the video monitor; and
serially transmitting the control signals from the tapping unit to the video monitor using the interface.

10. A method as claimed in claim 9, further comprising:
coupling one end of a second wire to the wire and coupling the other end of the second wire to a load.

11. A method as claimed in claim 10, wherein:
the load in an indicator; and
the method further comprises providing a further signal via the wire to control the indicator to indicate an on or off condition of at least the video monitor.

12. An in-flight entertainment system comprising:
a communication unit that provides in-flight entertainment system control signals;
a tapping unit connected to the communication unit and configured to receive the control signals;
a video monitor; and
an interface between the tapping unit and the video monitor and having a first end for coupling an input terminal of a comparator and a collector of a transistor of the tapping unit, and a second end for coupling an input terminal of a comparator and a collector of a transistor of the video monitor, to couple the tapping unit to the video monitor and provide the control signals to the video monitor serially over the single wire.

13. An in-flight entertainment system as claimed in claim 12, wherein:
the interface further comprises a second wire coupled in a "T" configuration to couple an indicator to the wire; and
the wire conveys a signal to control the indicator to indicate an on or off condition of at least the video monitor.

14. An in-flight entertainment system as claimed in claim 12, wherein:
the wire carries a signal indicating at least one of transmitting state and a receiving state of a microcontroller of the monitor.

* * * * *

UNITED STATES PATENT AND TRADEMARK OFFICE
CERTIFICATE OF CORRECTION

PATENT NO.       : 8,400,009 B2  
APPLICATION NO.  : 11/977961  
DATED            : March 19, 2013  
INVENTOR(S)      : Hong et al.

Page 1 of 3

It is certified that error appears in the above-identified patent and that said Letters Patent is hereby corrected as shown below:

In the Specifications:  
Column 1, Line 64: Please correct "as well as resister 224."  
to read -- as well as resistor 224. --

Column 1, Line 65: Please correct "Resister 224 is"  
to read -- Resistor 224 is --

Column 3, Line 58: Please correct "diodes 222 and 310"  
to read -- diodes 210 and 310 --

Column 3, Line 64: Please correct "the microcontroller 300"  
to read -- the microcontroller 302 --

In the Claims:  
Column 4, Line 44 through Column 6, Line 30: Please replace all claims (1-14) in the patent to read as follows:

-- 1. A display system, comprising:

a tapping unit, comprising:

an input that receives control signals from a communication unit of an in-flight entertainment system; and an output that outputs the received control signals;

a video monitor that displays information related to the control signals from the in-flight entertainment system, the video monitor comprising an input for receiving the control signals; and an interface between the tapping unit and the video monitor, the interface having a first end connected to an input terminal of a comparator and a collector of a transistor of the tapping unit, and a Signed and Sealed this  
Eleventh Day of March, 2014

Michelle K. Lee  
*Deputy Director of the United States Patent and Trademark Office* second end connected to an input terminal of a comparator and a collector of a transistor of the video monitor and being configured to serially transmit signals between the tapping unit and the video monitor.

2. The display system of Claim 1, wherein the interface includes a first wire and wherein the display system further comprises:

a second wire connected in a "T" configuration to the first wire for coupling the first wire to a load that is external of the tapping unit and the monitor.

3. The display system of Claim 2, wherein:

the second wire further couples the wire to a voltage supply via the load.

4. The display system of Claim 2, wherein:

the load includes an indicator; and the wire passes a signal to control the indicator to indicate an on or off condition of at least the video monitor.

5. The display system of Claim 4, wherein:

the indicator includes a lamp.

6. The display system of Claim 1, wherein:

the wire passes a signal indicating at least one of transmitting state and a receiving state of a microcontroller of the monitor.

7. The display system as claimed in claim 1, wherein the serially transmitted data is communicated using an RS-232 protocol.

8. The display system as claimed in claim 1, wherein the serially transmitted data is transmitted in half-duplex.

9. A method for passing control signals from a communication unit of an in-flight entertainment system to a video monitor in an in-flight entertainment system via a tapping unit, the method comprising:

providing an interface between the tapping unit and the video monitor and having a first end and a second end;

coupling the first end to an input terminal of a comparator and a collector of a transistor of the tapping unit;

coupling the second end to an input terminal of a comparator and a collector of a transistor of the video monitor; and serially transmitting the control signals from the tapping unit to the video monitor using the interface.

10. A method as claimed in claim 9, wherein the interface includes a first wire and where the method further comprises:

coupling a first end of a second wire to the first wire and coupling a second end of the second wire to a load.

11. A method as claimed in claim 10, wherein:

the load in an indicator; and the method further comprises providing a further signal via the wire to control the indicator to indicate an on or off condition of at least the video monitor.

12. An in-flight entertainment system comprising:

a communication unit that provides in-flight entertainment system control signals;

a tapping unit connected to the communication unit and configured to receive the control signals;

a video monitor; and an interface between the tapping unit and the video monitor and having a first end for coupling an input terminal of a comparator and a collector of a transistor of the tapping unit, and a second end for coupling an input terminal of a comparator and a collector of a transistor of the video monitor, to couple the tapping unit to the video monitor and provide the control signals to the video monitor serially over the interface.

13. An in-flight entertainment system as claimed in claim 12, wherein:

the interface includes a first wire;

the interface further comprises a second wire coupled in a "T" configuration to couple an indicator to the first wire; and the second wire conveys a signal to control the indicator to indicate an on or off condition of at least the video monitor.

14. An in-flight entertainment system as claimed in claim 12, wherein:

the wire carries a signal indicating at least one of transmitting state and a receiving state of a microcontroller of the monitor. --